(12) United States Patent
Imgram et al.

(10) Patent No.: US 6,601,911 B2
(45) Date of Patent: Aug. 5, 2003

(54) FRAME FOR A VEHICLE SLIDING SUNROOF OR SLIDE-AND-TILT SUNROOF

(75) Inventors: Bardo Imgram, Seligenstadt (DE); Joachim Roeder, Muhlheim (DE); Thomas Becher, Rodgau (DE)

(73) Assignee: ArvinMeritor GmbH, Dietzenbach (DE)

( * ) Notice: Subject to any disclaimer, the term of this patent is extended or adjusted under 35 U.S.C. 154(b) by 0 days.

(21) Appl. No.: 10/238,416

(22) Filed: Sep. 10, 2002

(65) Prior Publication Data

US 2003/0047968 A1 Mar. 13, 2003

(30) Foreign Application Priority Data

Sep. 11, 2001 (DE) .......................................... 101 44 742

(51) Int. Cl.⁷ ................................................. B60J 10/12
(52) U.S. Cl. ................................................. 296/216.08
(58) Field of Search ................. 296/223, 216.06–216.08

(56) References Cited

U.S. PATENT DOCUMENTS

| | | |
|---|---|---|
| 5,104,178 A | 4/1992 | Bienert |
| 5,527,086 A * | 6/1996 | Mori et al. ................. 296/223 |

FOREIGN PATENT DOCUMENTS

| | | | |
|---|---|---|---|
| DE | 2029318 | * 1/1971 | ................. 296/223 |
| DE | 3532103 A1 | 3/1987 | |
| DE | 100 53 531 A1 | 5/2001 | |
| JP | 10203173 | 8/1998 | |
| JP | 10297283 | 11/1998 | |
| JP | 11278059 | 10/1999 | |
| JP | 2001063371 | 3/2001 | |

OTHER PUBLICATIONS

European Search Report dated Jan. 15, 2003.

* cited by examiner

Primary Examiner—Dennis H. Pedder
(74) Attorney, Agent, or Firm—Carlsonk, Gaskey & Olds

(57) ABSTRACT

A frame is provided for a vehicle sliding sunroof or slide-and-tilt sunroof, essentially comprising a plastic injection molded front member with molded on corner areas and two metal side members fixed by way of the corner areas, guide tubes being incorporated into the front member and adjoining guide channels being arranged in the side members, which together and affording compressive rigidity carry drive cables For movements of a cover in relation to a roof opening of the roof structure. The associated guide tubes and the guide channels do not come into contact with one another, but are isolated from one another by intervals, which are spanned by connectors, so that vibrations of the guide tubes originating from the cable drive system cannot be transmitted to the metal side members. The ends of the guide tubes and the inlet ends of the guide channels separated at an interval therefrom, together with the hollow space spanning the ends are of special stepless design in order to prevent noises during drive cable displacements.

19 Claims, 5 Drawing Sheets

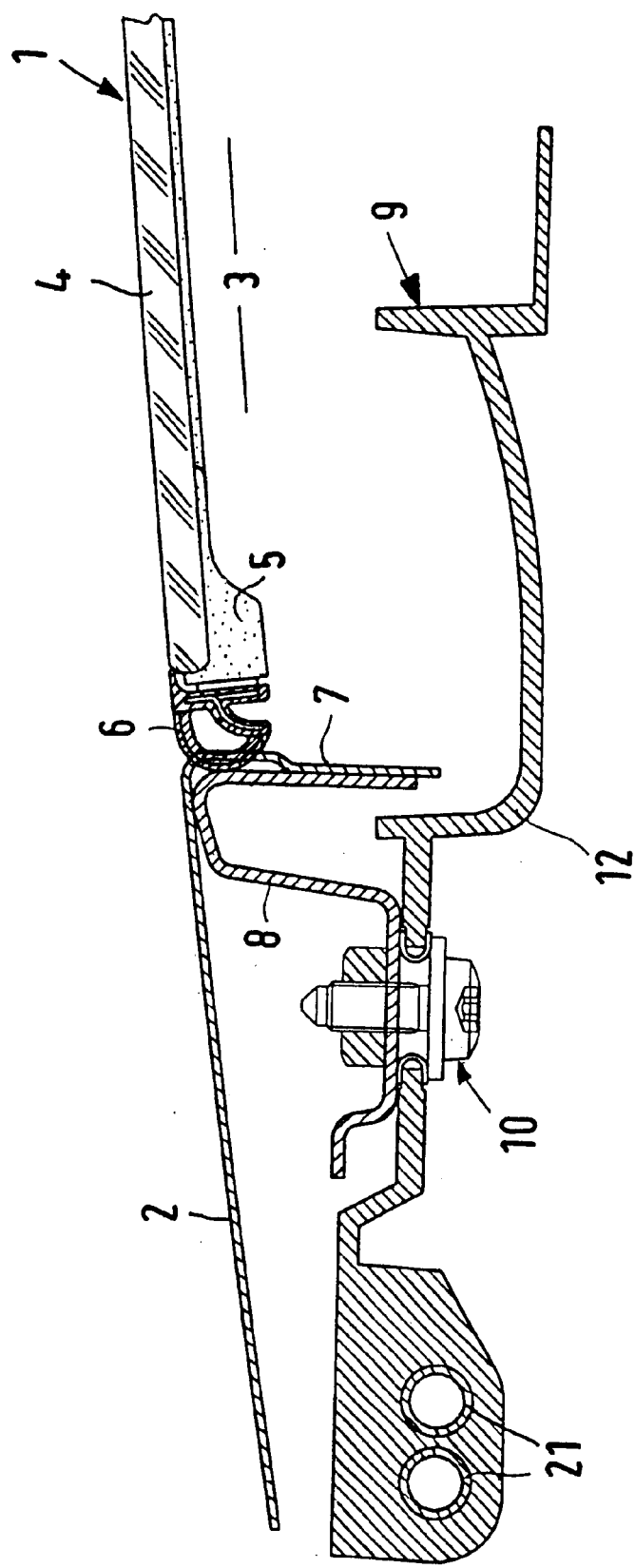

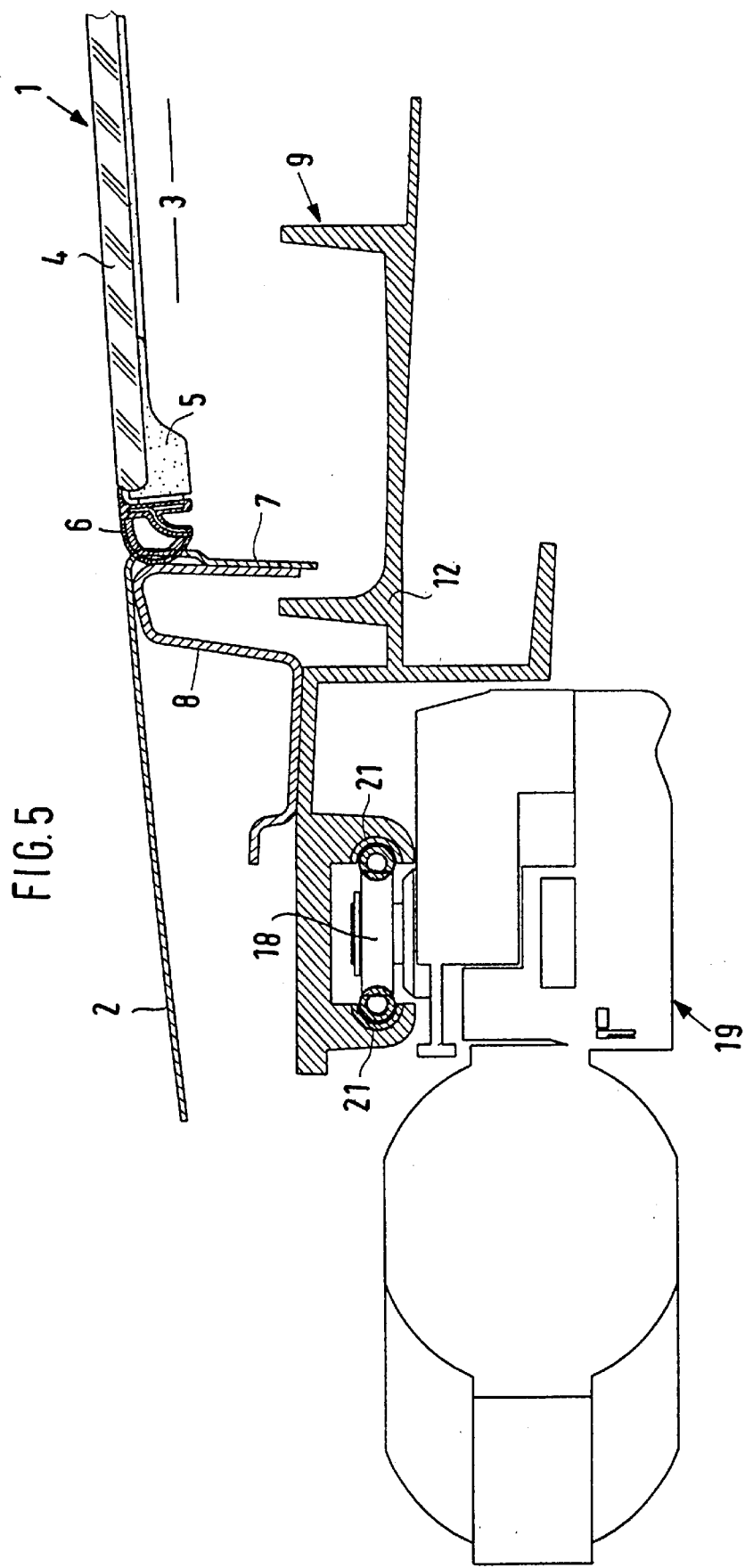

FRAME FOR A VEHICLE SLIDING SUNROOF OR SLIDE-AND-TILT SUNROOF

BACKGROUND OF THE INVENTION

The invention relates to a frame for a vehicle sliding sunroof or slide-and-tilt sunroof.

DESCRIPTION OF THE PRIOR ART

Such a known frame (DE 40 14 487 C1) is designed at the joints between the corner areas of a front member and side members so that the ends of the guide tubes project over the corner areas of the front member and can be inserted into cable guide channels in the side members. This is intended, during assembly, to provide the connection between front member and side members with the torsional rigidity and dimensional accuracy deemed necessary, so that these projecting guide tube ends serve as assembly aid for assembling and aligning the longitudinal members and the front member of the frame. In addition, this is also intended to provide a smooth transition between the projecting ends of the guide tubes and the guide channels in the side members.

This, however, gives rise to a stepped construction at the transitional points between the tube ends and the guide channels, which can lead during displacements of the drive cable to unwanted noise when the wire helical windings run over the steps. Furthermore, particularly in the case of a drive device equipped with electric motor, unwanted motor vibrations may be transmitted by the guide tubes directly to the metal side members.

SUMMARY OF THE INVENTION

An object of the invention is to provide a frame for a vehicle sliding sunroof or slide-and-tilt sunroof, in which no noise is generated and no motor vibrations can be transmitted at the transitional points between the guide tubes of the front member and the guide channels of the side members.

According to the present invention, there is provided a frame for a vehicle sliding sunroof or slide-and-tilt sunroof, which frame can be fitted beneath a fixed roof surface and is designed to guide and support a slidable or slidable and tiltable cover associated with a corresponding roof opening in the fixed roof surface, and which has two metal side members arranged parallel with one another and a front member formed as a plastic injection molded part, which as transition to the side members has molded-on corner areas, the side members having guide channels in which drive cables are guided in a compressive rigid manner, the cables being drive-connected to the cover, guided on the side members by means of guide shoes, running in guide tubes fitted to the front member and engaging with a drive device arranged on the front member for the displacement of the drive cables in the guide tubes and the guide channels, wherein the guide tubes each terminate in the corner areas of the front member at an interval in front of the associated guide channels of each of the side members, and wherein the said intervals are spanned by plastic connectors fixed both to the corner areas and to the side members.

Owing to the interval between the guide tube ends and the guide channels, or the metal side members having the guide channels, the guide tubes are, to an extent, isolated from the side members, so that the direct transmission of vibrations between these elements is avoided. The intervals between the guide tube ends and the guide channels in the side members also ensure that no stepped formations occur between these different sections of the drive cable ducting.

The plastic connectors may be designed as separate parts, which when duly positioned can be connected to the corner areas of the front member on the one hand and to the side members on the other, by clip connections, for example, but the connectors preferably form an integral part of the actual corner areas themselves.

The ends of the guide tubes may be molded in plastic inside the corner areas, a hollow space in the connector, spanning the interval to the respective, associated guide channel in the side member, adjoining and aligning with each guide tube.

The guide tubes and also the inlet ends of the cable guide channels may widen out in a funnel shape, in order to avoid any stepped formation inside the drive cable ducting.

Serving a similar object, according to which the cross-sectional dimensions of the hollow spaces may be greater than the inside diameters of the guide tubes and the cable guide channels. In this way, during slide movements the drive cables do not come into contact with the inside walls of the hollow spaces, which may appropriately be of cylindrical shape.

In order to ensure easy alignment of the guide tube ends with the cable guide channels when joining the front member to the side members, plastic supporting projections for the side members and lateral stops for the side members are advantageously and integrally molded on to the corner areas. These projections can be used to obtain an easily joined union of the frame members. Screw connections led through the projections and the side members may be used for this purpose.

BRIEF DESCRIPTION OF THE DRAWINGS

Further particulars of the invention are explained in more detail below with reference to the drawings showing sometimes diagrammatic representations of a preferred example of embodiment, and in which:

FIG. 4 shows the truncated section along the line IV—IV in FIG. 2 and FIG. 5 shows the truncated section along the line V—V in FIG. 2.

DESCRIPTION OF THE PREFERRED EMBODIMENT

Figure 1:
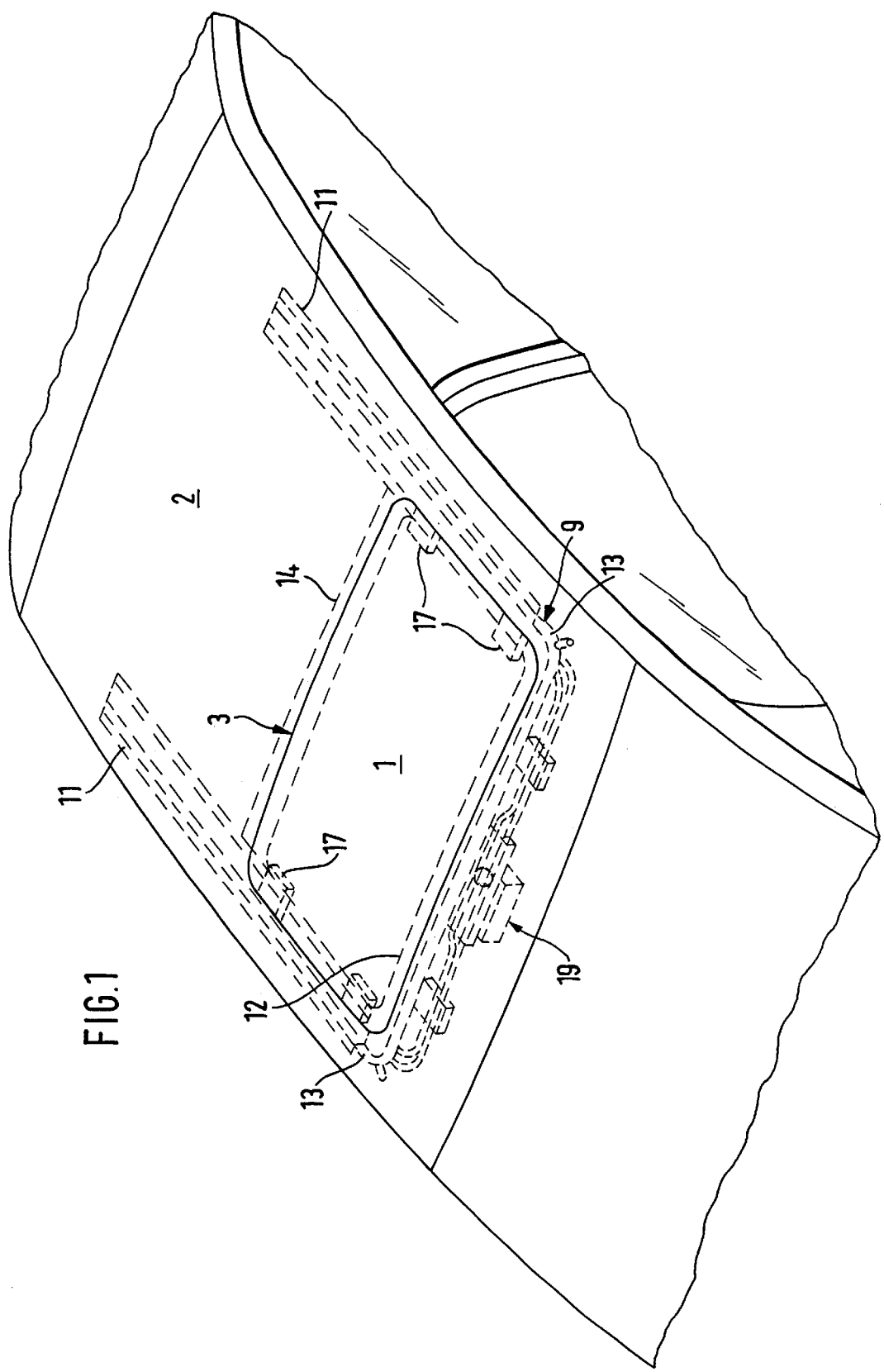
FIG. 1 shows a perspective view of a motor vehicle roof with fitted sliding sunroof, shown with the cover closed.

Referring to the drawings, a cover 1 closes off a roof opening 3 arranged in a fixed roof surface 2 and in the sequence of movements typical of sliding sunroofs can be displaced under the rear fixed roof surface 2 after first lowering its rear edge. In the case of a slide-and-tilt sunroof, the cover 1, in the sequence of movements typical of this type of roof, can in addition also be tilted upwards from the closed position by raising its rear edge in the manner of front-hinged flaps, sometimes in a continuous adjustment, in order to form a rear ventilation opening. In the example of embodiment shown there is a cover 1 having a glass panel 4, a cover frame 5 of plastic injected molded on to the former, and an edge gap seal 6 surrounding the cover pane 4 and the cover frame 5, which is intended to bear tightly against an edging 7 of the roof panel, forming the fixed roof surface 2, that defines the roof opening 3. A reinforcing frame 8, completely or partially surrounding the roof opening 3, is fitted to the fixed roof surface 2 or its edging 7 from below.

Figure 2:
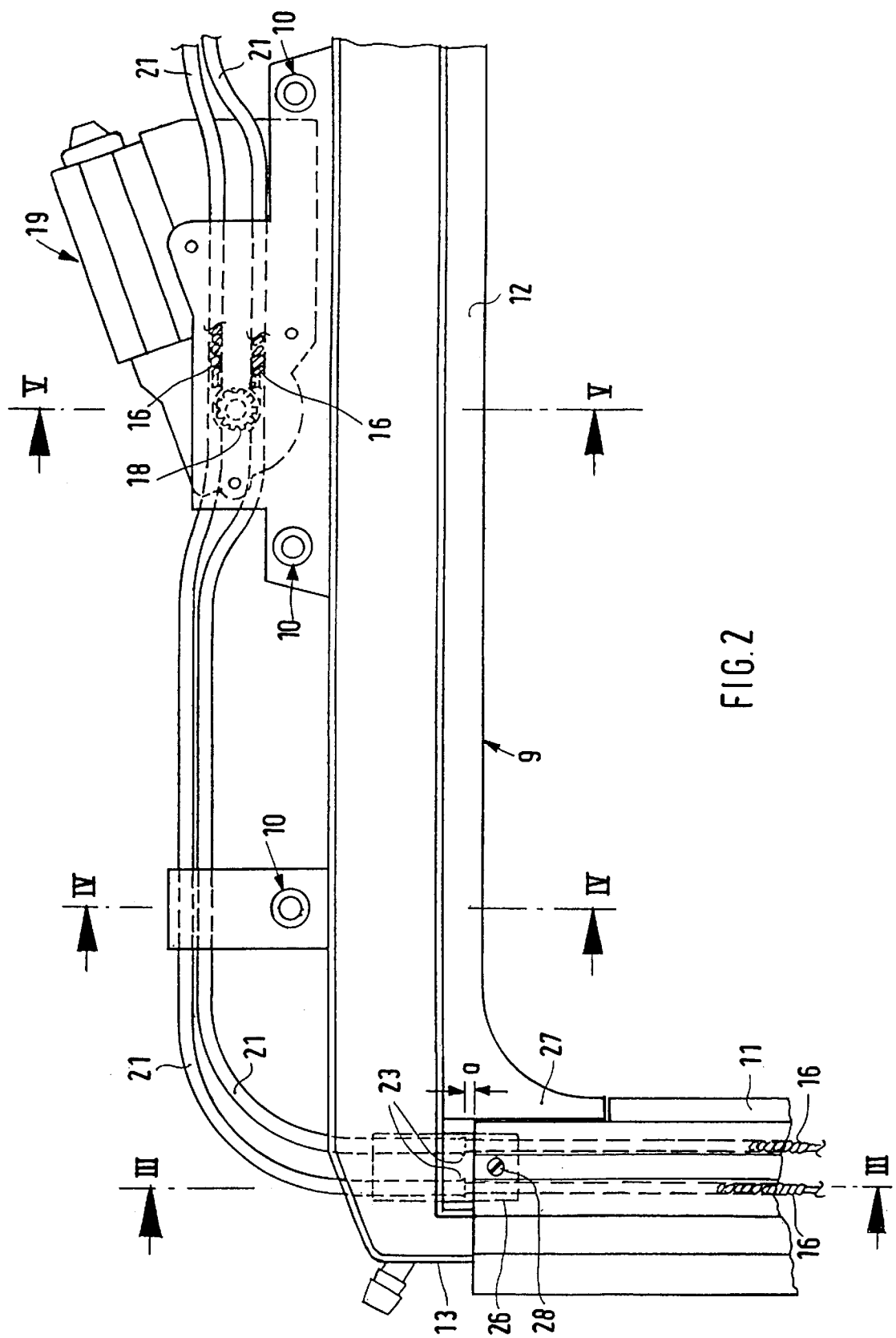
FIG. 2 shows the truncated top view of the frame of the sliding sunroof construction.
Figure 3:
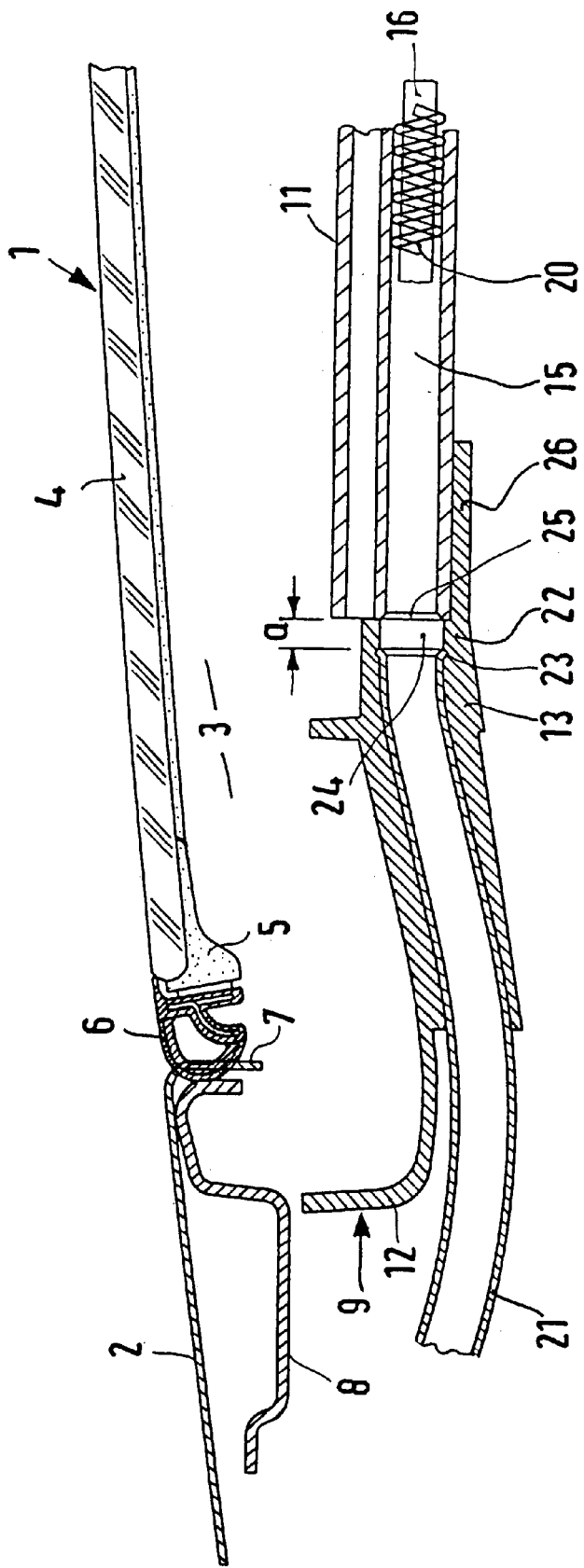
FIG. 3 shows the truncated section along the line III—III in FIG. 2.

Although only the frame is represented in top view in FIG. 2, the sectional representations according to FIGS. 3 to 5 show each of the parts of the roof construction situated above the frame, that is the cover 1, the fixed roof surface 2 and the reinforcing frame 8, in the position they occupy following assembly of the frame.

The frame 9 described below is fitted beneath the fixed roof surface 2 at a plurality of spaced points, three of which can be seen from FIG. 2, by means of screwed connections 10, one of which is represented in FIG. 4. The frame 9 comprises two metal side members 11 arranged parallel to one another, which are formed, for example, from a continuously cast aluminum profile, and a front member 12, which is formed as a plastic injection molded part, and as transition to the side members 11 has molded on corner areas 13. Approximately in the middle of their length, the two side members 11 are braced against one another by a cross-member 14 fixed to them, as is indicated in FIG. 1. Only the left-hand side member 11 is represented in FIG. 2, because the right-hand side member and the corner area 13 are of correspondingly mirror-symmetrical design.

Two guide channels 15 affording compressive rigidity, in which drive cables 16 are displaceably carried, are situated in each of the side members 11. The drive cables 16, only short sections of which are drawn in on each of FIGS. 2 and 3, are drive-connected to the cover 1, which is guided by guide shoes 17 (FIG. 1) on the side members 11. A drive pinion 18, which in the example shown can be driven in either direction of rotation by an electric motor-gear unit serving as drive device 19, is rotatably supported on the front member 12. The drive device, however, may also take the form of a hand crank drive mechanism.

The drive pinion 18 is in constant tooth engagement with both drive cables 16, so that rotations of the drive pinion 18 produce opposing displacements of each of the two drive cables 16 in their guides. For the tooth engagement, the drive cables 16 are provided with helical wire windings 20, as can clearly be seen from FIG. 3, so that they are driven like a toothed rack by the correspondingly toothed drive pinion 18. This drive system has been used for sliding sunroof drives for some decades now and therefore does not require further explanation here.

Guide tubes 21 for guiding the drive cables 16 are fixed to the front member on that side of the front member 12 remote from the roof opening, for example by locally molding the guide tubes 21 into the plastic material of the front member 12, so that after the molding process the guide tubes 21 previously laid in the injection mold form a fixed integral part of the front member 12. These bonding points of the guide tubes 12 to the front member 12 can be seen from FIGS. 2, 4 and 5.

As can be seen from FIGS. 2 and 3, and FIG. 3 in particular, the guide tubes 21 terminate in the corner areas 13 of the front member 12 at an interval (a) in front of the associated guide channels 15 of each of the side members 11. These intervals (a) between each of the associated but mutually isolated guide tube/guide channel pairs 21/15 are spanned by plastic connectors 22 fixed both to the corner areas 13 and to the side members 11. In the example shown these plastic connectors 22 are integrally formed with the corner areas 13.

The ends 23 of the guide tubes 12 are here embedded by molding into the plastic material of the corner areas 13. A hollow space 24 adjoining and aligning with the guide tube 21 is formed in the connectors 22 at each of the ends 23 of the guide tubes 21. This cylindrical hollow space in each case terminates at the end face of the connector 22 abutting the associated side member 11, and it aligns with the associated cable guide channel 15. The ends 23 of the guide tubes 21 widen out in a shape approximating to a funnel. The inlet ends 25 of the cable guide channels 15 also widen out correspondingly in a shape approximating to a funnel. In conjunction with the fact that the cross-sectional dimensions of the hollow spaces 24, that is to say their diameter in the case of a cylindrical design, is greater than the inside diameters of the guide tubes 21 and cable guide channels 15, this ensures that there is no stepped formation at these spanning points between the guide tubes 21 and the guide channels 15, which during displacements of the drive cables 16 might cause chattering noises due to the wire windings.

As FIG. 3 clearly shows, a projection 26 for positioned supporting of the associated side member 11 is molded on to each of the corner areas 13. In addition, a lateral stop 27 is molded onto each corner area 13 for the positioned abutment of the side member 11. Projection 26 and stop 27 ensure that when assembling the frame members 11 and 12 the guide channels 15 and the guide tubes 21 are brought into precise axial alignment.

During assembly, the front member 12 and the side members 11 can be fixed together by means of the projections 26, this fixed connection being achieved by means of screws 28 or the like, which are introduced both through the projections 26 and through the side members 11, as is indicated in FIG. 2.

In summary, a frame 9 is proposed for a vehicle sliding sunroof or slide-and-tilt sunroof, basically comprising a plastic injection molded front member 12 with molded on corner areas 13 and two metal side members 11 fixed by way of the corner areas, guide tubes 21 being incorporated into the front member 12 and adjoining guide channels 15 being arranged in the side members 11, which together and affording compressive rigidity carry drive cables 16 for movements of a cover 1 in relation to a roof opening 3 of the roof structure. The associated guide tubes 21 and the guide channels 15 do not come into contact with one another, but are isolated from one another by intervals (a), which are spanned by connectors 22, so that vibrations of the guide tubes 21 originating from the cable drive system cannot be transmitted to the metal side members 11. The ends 23 of the guide tubes 21 and the inlet ends 25 of the guide channels 15 separated at an interval therefrom, together with the hollow space 24 spanning the ends 23, 25 are of special stepless deign in order to prevent noises during drive cable displacements. The proposed frame may also be used in top ridge sliding sunroofs (spoiler roofs).

We claim:
1. A frame for a vehicle sunroof comprising;
   a plurality of side members arranged parallel with one another and including guide channels for guiding drive cables,
   a front member, having corner areas that end near corresponding one of said side members, said front member having guide tubes with ends in said corner areas that guide the drive cables, and
   connectors positioned between said corner areas and to said side members such that ends of said guide channels are spaced from the ends of said guide tubes.
2. The frame according to claim 1, wherein said connectors are integrally formed with said corner areas.

3. The frame according to claim 1, wherein said connectors comprise plastic.

4. The frame according to claim 1, wherein said connectors each include a hollow space through said connectors extending between the ends of said guide tubes and the ends said guide channels.

5. The frame according to claim 4, wherein a cross-sectional dimension of said hollow space is greater than an inside dimension of said guide tubes and an inside dimension of said cable guide channels.

6. The frame according to claim 5, wherein the ends of said guide tubes include an increasing inside dimension that is largest near a terminal edge of said tubes.

7. The frame according to claim 4, wherein said hollow spaces are generally cylindrical.

8. The frame according to claim 1, wherein ends of said guide channels and said guide tubes include an increasing dimension that is largest near a terminal edge of the channels and the tubes respectively.

9. The frame according to claim 1, including a projection and lateral stops that abut said side members, said projection and stops being molded on said corner areas.

10. The frame according to claim 9, wherein said front member and said side members are fixed to one another by said projections.

11. The frame according to claim 9, wherein said front member and side members are fixed to one another by screws, extending at least partially through said projections and said side members.

12. A frame for a vehicle sunroof comprising:

side members arranged parallel with one another;

a plastic injection molded front member, which has molded-on corner areas as transition to said side members;

guide channels formed in side members, said guide channels for guiding drive cables, said drive cables being drive-connected to a cover;

guide shoes running in guide tubes fitted to said front member and engaging with a drive device arranged on said front member for the displacement of said drive cables;

said guide tubes terminating in said corner areas at intervals in front of the associated guide channels of each of said side members; and plastic connectors fixed to the corner areas and to said side members spanning said intervals.

13. The frame according to claim 12, wherein said connectors each include a hollow space formed in said connectors and terminating at an end face of said connector for adjoining and aligning said guide tubes and said guide channel.

14. The frame according to claim 13, wherein a cross-sectional dimension of said hollow space is greater than an inside dimension of said guide tubes and an inside dimension of said guide channels.

15. The frame according to claim 13, wherein said hollow spaces are of cylindrical shape.

16. The frame according to claim 12, wherein the ends of said guide channels and said guide tubes include an increasing inside dimension that is largest near a terminal edge.

17. The frame according to claim 12, including projections for supporting said side members and lateral stops that abut of said side members, said projections and lateral stops are molded on said corner areas.

18. The frame according to claim 17, wherein said front member and said side members are fixed to one another by said projections.

19. The frame according to claim 17, wherein said front member and side members are fixed to one another by screws extending at least partially through said projections and said side members.

* * * * *